(12) United States Patent
Khalil et al.

(10) Patent No.: US 11,218,481 B2
(45) Date of Patent: Jan. 4, 2022

(54) PERSONAL IDENTITY SYSTEM

(71) Applicant: Verizon Patent and Licensing Inc., Basking Ridge, NJ (US)

(72) Inventors: Manah M. Khalil, Coppell, TX (US); Michael R. Lamison, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/892,435

(22) Filed: Jun. 4, 2020

(65) Prior Publication Data

US 2021/0385216 A1 Dec. 9, 2021

(51) Int. Cl.
*H04L 9/32* (2006.01)
*H04L 29/06* (2006.01)

(52) U.S. Cl.
CPC ........ *H04L 63/0884* (2013.01); *H04L 9/3213* (2013.01); *H04L 9/3221* (2013.01); *H04L 9/3271* (2013.01); *H04L 63/0442* (2013.01)

(58) Field of Classification Search
CPC . H04L 63/0884; H04L 9/3213; H04L 9/3221; H04L 9/3271; H04L 63/0442
See application file for complete search history.

(56) References Cited

U.S. PATENT DOCUMENTS

| | | | |
|---|---|---|---|
| 10,637,665 B1* | 4/2020 | Sundaresan | H04L 63/0815 |
| 2017/0250972 A1* | 8/2017 | Ronda | H04L 63/123 |
| 2019/0097812 A1* | 3/2019 | Toth | H04L 9/3213 |
| 2019/0190724 A1* | 6/2019 | Sundaresan | H04L 9/3226 |
| 2019/0333054 A1* | 10/2019 | Con | G06F 21/31 |
| 2020/0067907 A1* | 2/2020 | Avetisov | H04L 9/3218 |
| 2020/0145229 A1* | 5/2020 | Li | H04L 9/3239 |
| 2020/0153606 A1* | 5/2020 | Li | H04L 63/08 |
| 2020/0226285 A1* | 7/2020 | Bulleit | G06F 21/33 |
| 2021/0067340 A1* | 3/2021 | Ferenczi | G06F 21/645 |

* cited by examiner

*Primary Examiner* — Techane Gergiso

(57) ABSTRACT

A service provider may offer an identity proofing service that can be used to generate verifiable credentials (VCs) with customer-selected attributes. The VCs may use cryptographic signatures to indicate proof of identity certified by, for example, a telecommunications service provider. After a one-time process to obtain the VCs and associate them with a shell identity, the customer with a client device may use the VCs as a form of authentication for relying parties in a two-way (e.g., peer-to-peer) authentication process.

20 Claims, 10 Drawing Sheets

- 505 → Namespace:
- 510 → Key:
- 515 → Value:
- 520 → Tag:
- 525 → Issuer: 3rd Party Identity or <SELF> if self-attested
- 530 → Subject:
- 535 → IsArray:
  - Index: If IsArray is true. This allows the implementation of a set of VC's that are related, such as having multiple email addresses, or multiple credit cards. The use of Index along with the Tag provides more information to select a specific VC.
- 540 → Type: Text, Record, Image, Video, Audio, Other Binary, Consent
  - Format (for Text): Date, Time, DT, Number, Currency, Text, email, IPv4, IPv6, URL, URI, Other
- 545 → Delivery Type: Static or Live Stream (associated with Type)
- 550 → Retention Policy on Recipient: One Time, Persist, Time-based
  - Expiry Date on Recipient: (if Time-based)
- 555 → Date Issued:
- 560 → Expiry:
- 565 → IsZKP(zero-knowledge proof):
- 570 → Date Stored:
- 575 → Classification:

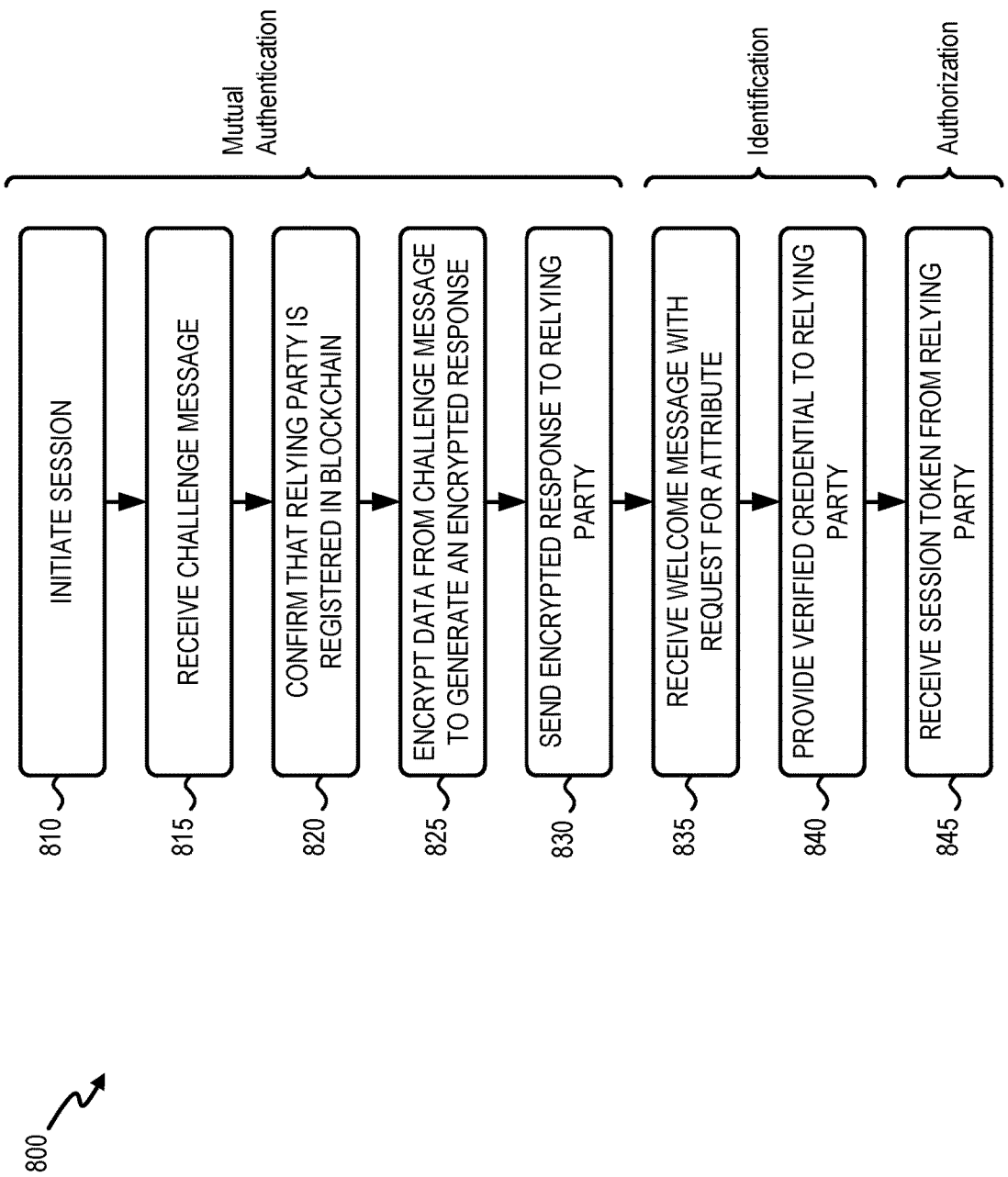

PERSONAL IDENTITY SYSTEM

BACKGROUND

An identity for an entity may include a combination of a unique identifier with an associated proof of ownership and an associated set of attributes that define the entity. An entity in the physical world is typically a person. In the digital world, an entity could be a person, a device, an application or a service

BRIEF DESCRIPTION OF THE DRAWINGS

FIG. 5 is a diagram illustrating exemplary fields that may be included in verifiable credentials for an entity, according to an implementation;

FIGS. 8-9D are flow diagrams illustrating an exemplary process for authentication via a digital identity, according to an implementation describe herein.

DETAILED DESCRIPTION OF THE PREFERRED EMBODIMENTS

The following detailed description refers to the accompanying drawings. The same reference numbers in different drawings may identify the same or similar elements.

The equivalent of a physical identification (ID) card in the digital world is a digital record that can encode similar authentication information and can be validated against the person owning that identity. However, in order to use this digital identity with a remote system, the identity proofing needs to rely on a practical validation process. This can be achieved through the use of a different factor, such as "something you have" or "something you know." Typically, password and secret keys would be used in such scenarios. However, the use of such password and secret keys mean that remote systems or entities would need to store that information, rendering this factor as significantly weak and vulnerable to identity theft.

Another current authentication method is federated authentication, where a client that attempts to access a service (e.g., provided by a relying party) is redirected to a third party. The third party may authenticate the client and provide a token to the client. The client may then provide the token to the relying party, which in turn communicates with the third party to confirm that the token in valid. Federated authentication thus requires participation of a third party for each authentication attempt to a relying party. Furthermore, the third party may be put in a position of assuming liability of any improper/unauthorized access to the relying party's system. Thus, federated authentication may not be suitable for services that require sensitive and/or financial data.

Telecommunication service providers have a unique relationship with their customers that can serve as a basis for generating a Self-Sovereign Identity (SSI). For example, a telecommunication service provider may know, for a typical customer, a variety of information that can be used together for authentication purposes, such as mobile device identifiers, addresses/locations, social security numbers, a credit history, account numbers, age, and the like. According to implementations described herein, a service provider, such as a telecommunication service provider, may offer an identity proofing service that can be used to generate verifiable credentials (VCs) with customer-selected attributes. The VCs may use cryptographic signatures to indicate proof of identity certified by, for example, the telecommunications service provider. After a one-time process to obtain the VCs and associate them with a shell identity, the customer may then use the VCs as a form of authentication for relying parties in a two-way (e.g., peer-to-peer) authentication process, without providing third parties personal information of the parties that they may store, or use in some other way, in previous authentication processes.

Figure 1:
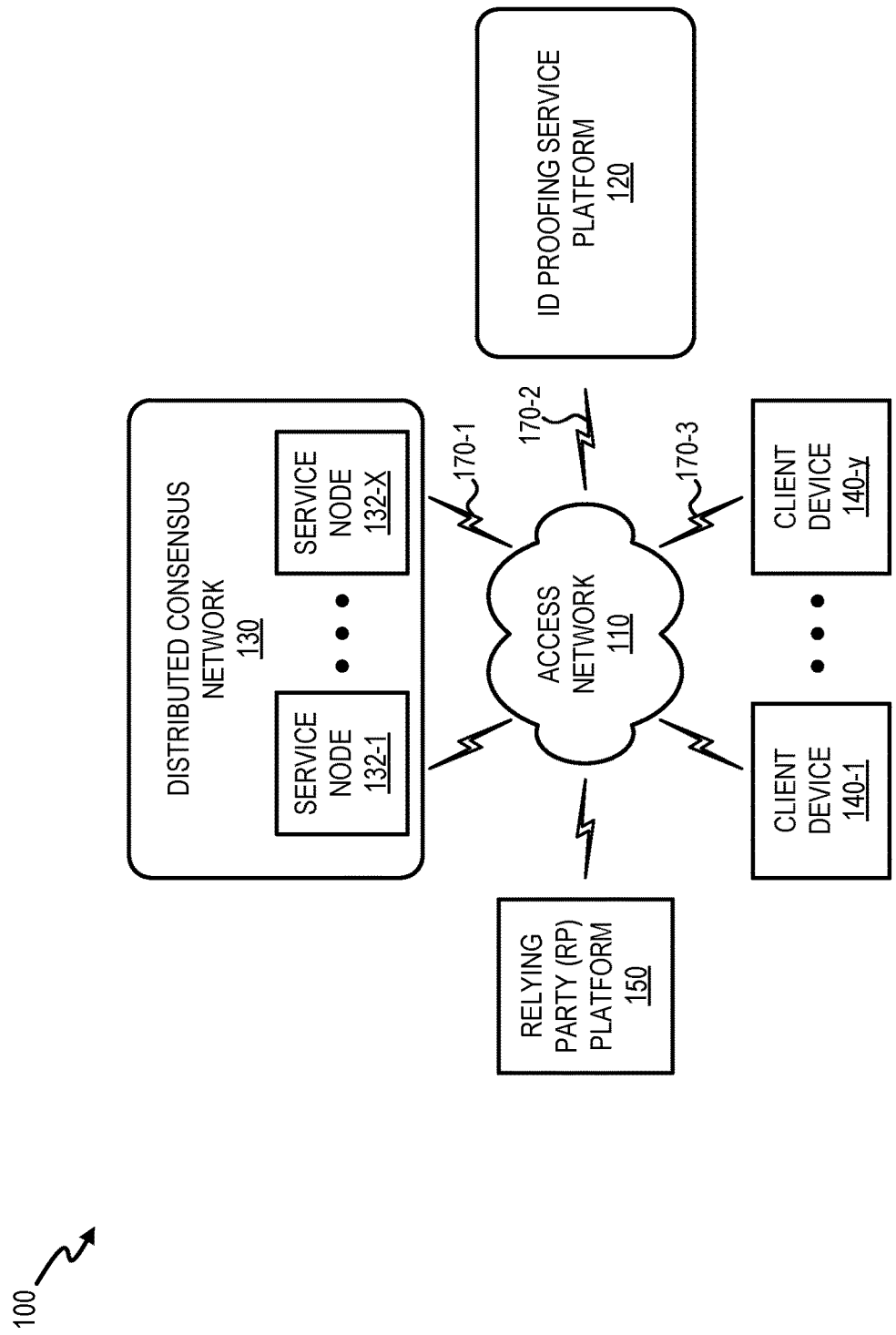
FIG. 1 is a diagram that depicts an exemplary environment in which systems and methods described herein may be implemented.

FIG. 1 is a diagram illustrating an exemplary environment 100 in which systems and methods described herein may be implemented. As illustrated, environment 100 may include an access network 110, an ID proofing service platform 120, a distributed consensus network 130, client devices 140-1 through 140-Y (also referred to as collectively as "client devices 140" and, individually or generically as "client device 140"), and a relying party (RP) platform 150.

Access network 110, ID proofing service platform 120, distributed consensus network 130, client devices 140, and RP platform 150 may include one or more network elements, computing devices, or be combined within one or more network elements or computing devices. A network element may be implemented according to a centralized computing architecture, a distributed computing architecture, or a cloud computing architecture (e.g., an elastic cloud, a private cloud, a public cloud, a virtual cloud etc.). Additionally, a network element may be implemented according to one or multiple network architectures (e.g., a client device, a server device, a peer device, a proxy device, and/or a cloud device).

As further illustrated, environment 100 includes communication links 170 between the network elements and networks (although only three are referenced in FIG. 1 as links 170-1, 170-2, and 170-3). A network element may transmit and receive data via a link 170. Environment 100 may be implemented to include wireless and/or wired (e.g., electrical, optical, etc.) links 170. A communication link between network elements may be direct or indirect. For example, an indirect communication link may involve an intermediary device or network element, and/or an intermediary network not illustrated in FIG. 1. Additionally, the number, the type (e.g., wired, wireless, etc.), and the arrangement of links 170 illustrated in environment 100 are exemplary.

Access network 110 may include one or multiple networks of one or multiple types. For example, access network 110 may include a terrestrial network, a satellite network, a wireless network, and/or a wired network. In some implementations, access network 110 may incorporate other networks, such as a core network or a backhaul network.

ID proofing service platform 120 includes one or multiple networks of one or multiple types. In one implementation, ID proofing service platform 120 may be included, for example, within a service provider network, such a telecommunications service provider's network. Thus, ID proofing service platform 120 may be included within an Internet Protocol (IP) Multimedia Subsystem (IMS) network, a private IP network, a cloud network, a wide area network (WAN), a metropolitan area network (MAN), a service provider network, or some other type of backend network. ID proofing service platform 120 may have access to account information associated with a user of a client device 140. For example, as a function within a telecommunications service provider network, ID proofing service platform 120 may have access to account information, such as account numbers, device identifiers, addresses, and the like, that may serve as attributes for verifiable credentials for an entity. At the request of an entity (e.g., a customer of the telecommunications service provider), ID proofing service platform 120 generates and provides VCs (e.g., in a decentralized identity (DID) format) to client devices 140 based on customer attributes, for example, with cryptographic signatures certified by ID proofing service platform 120.

Distributed consensus network 130 may include network devices that participate in validation of shared ledger entries, also referred to as a blockchain. In one implementation, distributed consensus network 130 may include some or all of service nodes 132. In another implementation, distributed consensus network 130 may include nodes (not shown) other than service nodes 132. For example, multiple servers or proxy nodes running in cloud or edge compute clusters/farms can be leveraged as the consensus network to reduce a burden on service nodes 132.

Service node 132 includes one or more network devices that provide storage and/or computing resources for a given service. According to an implementation described herein, each service node 132 may leverage the shared ledger to provide identity services for client devices 140. Each participating service node 132 in distributed consensus network 130 maintains a continuously-growing list of records referred to herein as a "shared ledger," which is secured from tampering and revision. Identity records from client devices 140 (or a trusted node) will be added into the shared ledger. Each version of the shared ledger contains a timestamp and a link to a previous version of the shared ledger. The authorization is added in chronological order to the shared ledger, and the shared ledger is presented to each of participating nodes in distributed consensus network 130 as a cryptographically secured block. Each entry of the shared ledger may be considered a node in a hash tree structure for efficiency. This hash tree ensures that blocks received from client device 140 (or another trusted node) are received undamaged and unaltered, and enables distributed consensus network 130 to check that the other nodes in distributed consensus network 130 do not have fraudulent or inaccurate blocks in the shared ledger.

As described herein, blockchain technology in distributed consensus network 130 may be leveraged for features of distribution/discoverability and immutability. Identities that are provisioned on the blockchain and referenced by their immutable public identifiers (public keys) can be shared and discovered by various entities connected to the blockchain. The blockchain constitutes a "trust fabric" that participants in a distributed identity system can rely on to authenticate each other, transact digital operations, and share data. According to one implementation, distributed consensus network 130 may employ a known blockchain system, such as HYPERLEDGER or any other blockchain system.

Client device 140 may include a connected device or computing device operated by a user or on behalf of a user. Client device 140 may request items or services from an RP platform 150, which may require authentication. For example, client device 140 includes a client, such as a web browser or another suitable software application. In one implementation, client device 140 may include a web browser or other user interface to exchange data with RP platform 150. In one implementation, client device 140 may include an SSI application to facilitate authentication procedures using decentralized identifiers. The SSI application may interface with ID proofing service platform 120 to establish a private/public key pair and verifiable credentials based on attributes of the user.

As described further herein, the public key may be used as the basis for an identity shell in the shared ledger of distributed consensus network 130. VCs that are issued by ID proofing service platform 120, based on user attributes, may be stored locally in a secure local memory of client device 140 separate from another secure memory area for the private key. Client device 140 may provide a relying party (e.g., RP platform 150) with the identity shell to initiate an authentication process, such as an authentication process required to access internet services or to use an application. An entity (e.g., a user) may selectively control which VCs (if any) are shared with a relying party (RP platform 150) to authenticate a user.

RP platform 150 may include one more network devices or computing devices. RP platform 150 may be implemented as a web server, an application server, a streaming server, or another type of device. According to an exemplary embodiment, RP platform 150 authenticates users of client devices 140 before providing services, such as social media services, information services, banking services, gaming services, etc. According to an implementation, RP platform 150 may require user authentication before allowing access to services via client device 140. Similar to client devices 140, each RP platform 150 may register an identity shell in a shared ledger of distributed consensus network 130.

According to systems and methods described herein, network environment 100 provides a trusted identity system with trusted identity issuers (e.g., ID proofing service platform 120), well-trusted and established identities (e.g., identity shells supported by VCs) provided by the above issuers, and a system that can securely and reliably share and validate the above identities in peer-to-peer exchanges (e.g., between client devices 140 and RP platform 150).

The number of network elements, the number of networks, and the arrangement in environment 100 are exemplary. According to other embodiments, environment 100 may include additional network elements, fewer network elements, and/or differently arranged network elements, than those illustrated in FIG. 1. For example, environment 100 may include multiple ID proofing service platforms 120, RP platforms 150, and so forth. Additionally, or alternatively, according to other embodiments, multiple network elements may be implemented on a single device, and conversely, a network element may be implemented on multiple devices. In other embodiments, one network in environment 100 may be combined with another network.

Figure 2:
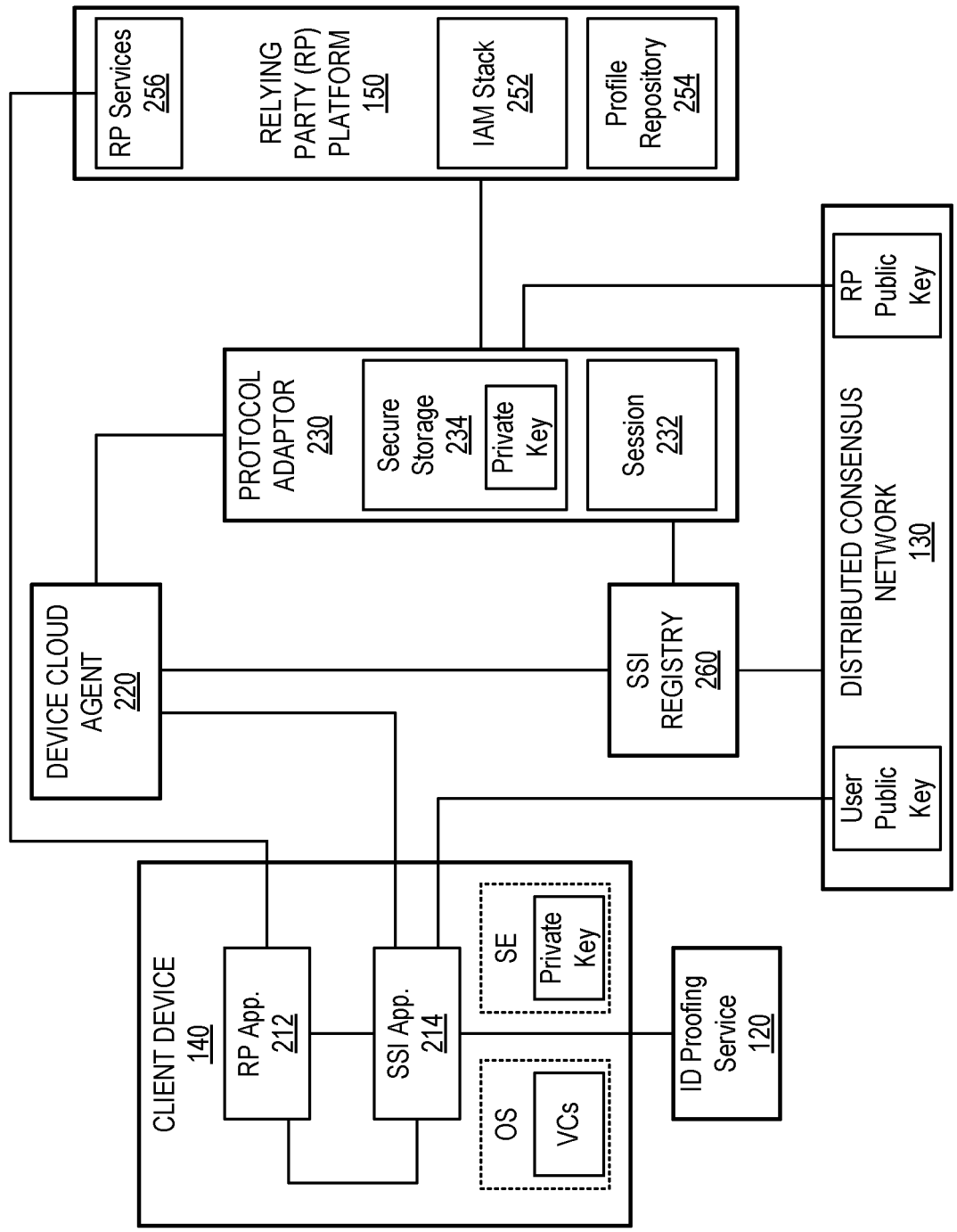
FIG. 2 a block diagram illustrating an embodiment of a network architecture for implementing a Self-Sovereign Identity (SSI) in the network environment of FIG. 1.

FIG. 2 is a bock diagram illustrating an embodiment of a network architecture for implementing SSIs in network environment 100. As shown in FIG. 2, client device 140 may include an RP application 212 and a SSI application 214. A device cloud agent 220 and a protocol adaptor 230 may provide an interface between client device 140 and RP platform 150.

RP application 212 may include an application for a company that provides services to a user of client device 140. RP application 212 may include, for example, a social media application, a banking application, gaming application, a shopping application, etc. When RP application 212 requires authentication of a user before providing services, RP application 212 may interface with SSI application 214. SSI application 214 may manage SSI authentication for RP application 212 via peer-to-peer connection with RP platform 150.

SSI application 214 may create a private/public key pair and conduct a one-time identity setup procedure with ID proofing service platform 120. SSI Application 214 may store the public key of the key pair in distributed consensus network 130, while storing the private key in local storage (e.g., a secure enclave) of client device 140. VCs, which are generated during the one-time setup procedure and signed by, for example, ID proofing service platform 120, may be stored in a different local memory location of the client device operating system (e.g., iOS Keychain, ANDROID Account Manager, etc.) in a manner that requires secure authentication information to enable access. In other implementations, some VCs may additionally or alternatively be stored (in encrypted form) on a secure external storage platform (e.g., InterPlanetary File System (IPFS)).

To initiate a peer-to-peer authentication (e.g., based on a request from RP app 212) at some time after performing the setup procedures, SSI app 214 may submit the public key to device cloud agent 220. In order to preserve the privacy of client device 140 and its user, authentication activity may be proxied through device cloud agent 220, which acts on behalf of client device 140/SSI app 214. Device cloud agent 220 predominantly acts as a dummy pipeline to receive and send private, encrypted and secure messages between client device 140 and RP platform 150. Device cloud agent 220 may provide a managed service to facilitate authentication requests, protect against discovery of an IP address used by client device 140, and queue off-line authentication requests (e.g., in an encrypted format). Device cloud agent 220 may retrieve records, as needed, from distributed consensus network 130. In another implementation, the functions of device cloud agent 220 may be replaced by a component in SSI app 224, to permit direct communications from client device 140 to protocol adaptor 230 and/or RP platform 150.

Protocol adaptor 230 provides an interface with RP platform 150 to convert SSI authentication protocols from device cloud agent 220/client device 140 to legacy Identity and Access Management (IAM) authentication protocols and to convert IAM authentication protocols from RP platform 150 back to SSI protocol for cloud agent 220/client device 140. Thus, protocol adaptor 230 may minimize impact for RP platform 150 to implement SSI authentication. According to an implementation, protocol adaptor 230 may manage individual sessions 232 with, for example, different client devices 140. Protocol adaptor 230 may include secure storage 234 to maintain an RP private key for each RP platform. Protocol adaptor 230 may retrieve records, as needed, from distributed consensus network 130. In one implementation, protocol adaptor 230 may bridge DID-based protocols with OAuth protocols. For example, protocol adaptor 230 may perform authentication with client device 140 using a DID-based protocol, and then communicate with an IAM stack 252 and request an authentication code or an access token from, RP platform 150 to return to client device 140. As described further herein, protocol adaptor 230 may also facilitate intermediate exchanges to collect additional attributes (e.g., VCs) from client device 140 as part of, for example, a first authentication attempt by client device 140. Upon a successful authentication by RP platform 150, SSI App 214 may confirm the authentication to RP application 212 and RP application 212 may use the Auth Code or Access token to connect to, for example, RP services 256.

SSI registry 260 may include an application and/or data structure to cross-reference an entity's public key (e.g., a shell identity) with a human readable alias. Data for SSI registry may be accumulated, for example, when ID proofing service platform 120 exchanges data with a user to initially generate an SSI. SSI registry 260 may facilitate off-line initiation of an authentication process. For example, a representative of company (e.g., associated with RP platform 150) may seek to initiate an authentication procedure based on a conversation with a user (e.g., a person) apart from client device 140. In another example, a user may attempt to access services using a web browser that is not associated with client device 140. Since a public key may typically include a universally unique alpha-numeric string that is difficult to remember and/or dictate (e.g., "AaBcNNGep . . . M6yeTR52"), a person may rely on an alias (e.g., "JimBest68"), which can be cross-referenced with the public key using registry 260 to initiate an authentication procedure.

While FIG. 2 shows exemplary components and links, in other implementations, the network architecture of FIG. 2 may include fewer components, different components, differently-arranged components, or additional components than depicted in FIG. 2. Additionally or alternatively, one or more components of FIG. 2 may perform functions described as being performed by one or more other components of FIG. 2.

Figure 3:
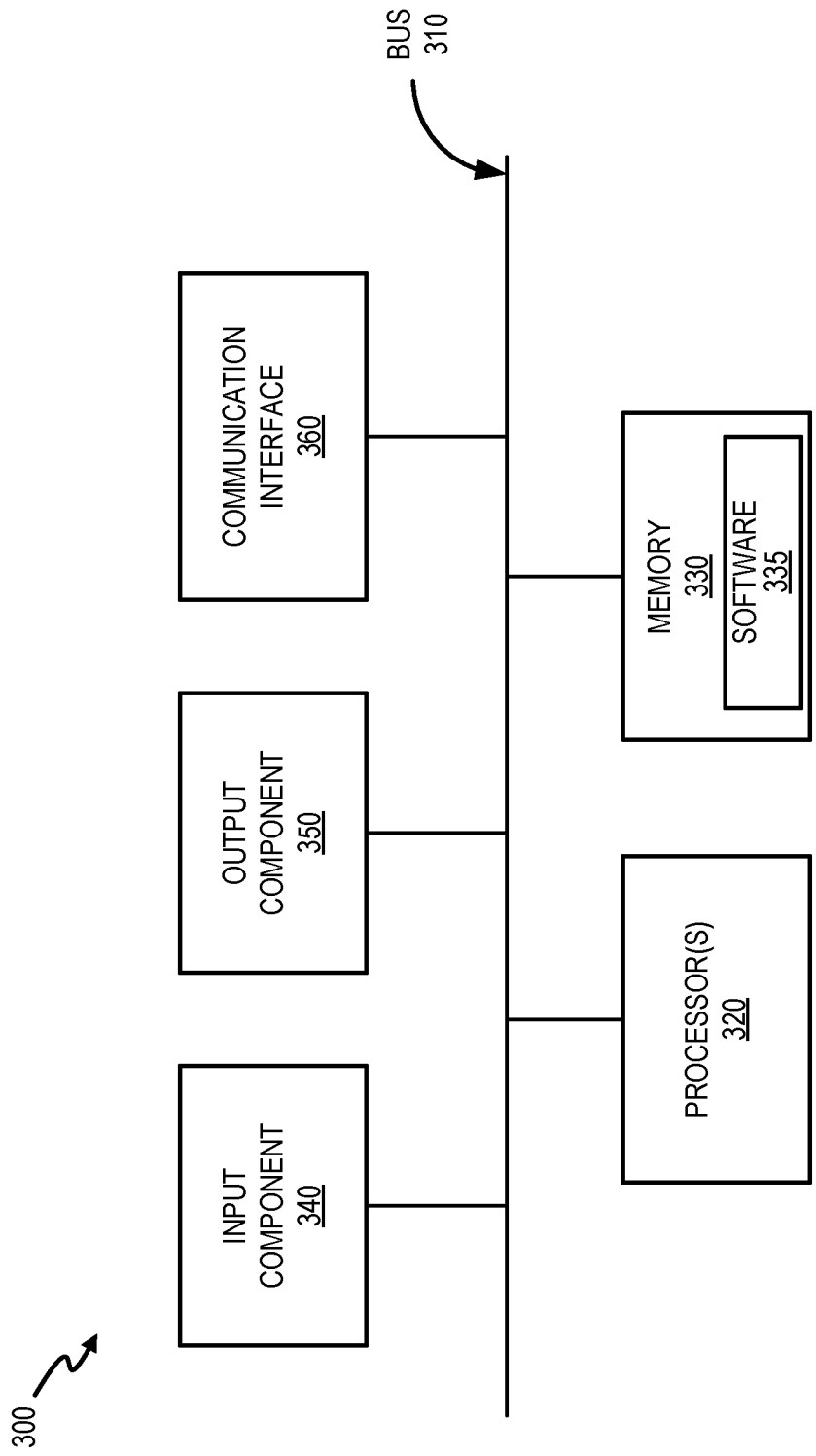
FIG. 3 is a diagram illustrating exemplary physical components of a device that may be used in the network environment of FIG. 1.

FIG. 3 is a diagram illustrating exemplary physical components of a device 300. Device 300 may correspond to one or more of the network elements, such as ID proofing service platform 120, service nodes 132, client devices 140, RP platform 150, device cloud agent 220, protocol adaptor 230, and SSI registry 260 depicted in network environment 100. Device 300 may include a bus 310, a processor 320, a memory 330, an input component 340, an output component 350, and a communication interface 360.

Bus 310 may include a path that permits communication among the components of device 300. Processor 320 may include one or more processors, microprocessors, or processing logic that may interpret and execute instructions. Memory 330 may include any type of dynamic storage device that may store information and instructions, for execution by processor 320, and/or any type of non-volatile storage device that may store information for use by processor 320.

Software 335 includes an application or a program that provides a function and/or a process. Software 335 is also intended to include firmware, middleware, microcode, hardware description language (HDL), and/or other form of instruction. By way of example, with respect to the network elements that include logic to provide blockchain entry authentication, these network elements may be implemented to include software 335. Additionally, for example, client device 140 may include software 335 (e.g., an application to communicate with ID proofing service platform 120, service node 132, RP platform 150, device cloud agent 220, protocol adaptor 230, etc.) to perform tasks as described herein.

Input component 340 may include a mechanism that permits a person to input information to device 300, such as a keyboard, a keypad, a button, a switch, etc. Output component 350 may include a mechanism that outputs information to the person, such as a display, a speaker, one or more light emitting diodes (LEDs), etc.

Communication interface 360 may include a transceiver that enables device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of radio frequency (RF) signals. In one implementation, for example, communication interface 360 may communicate with a network and/or devices connected to a network. Alternatively or additionally, communication interface 360 may be a logical component that includes input and output ports, input and output systems, and/or other input and output components that facilitate the transmission of data to other devices.

Device 300 may perform certain operations in response to processor 320 executing software instructions (e.g., software 335) contained in a computer-readable medium, such as memory 330. A computer-readable medium may be defined as a non-transitory memory device. A non-transitory memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Device 300 may include fewer components, additional components, different components, and/or differently arranged components than those illustrated in FIG. 3. As an example, in some implementations, a display may not be included in device 300. In these situations, device 300 may be a "headless" device that does not include input component 340. As another example, device 300 may include one or more switch fabrics instead of, or in addition to, bus 310. Additionally, or alternatively, one or more components of device 300 may perform one or more tasks described as being performed by one or more other components of device 300.

Figure 4:
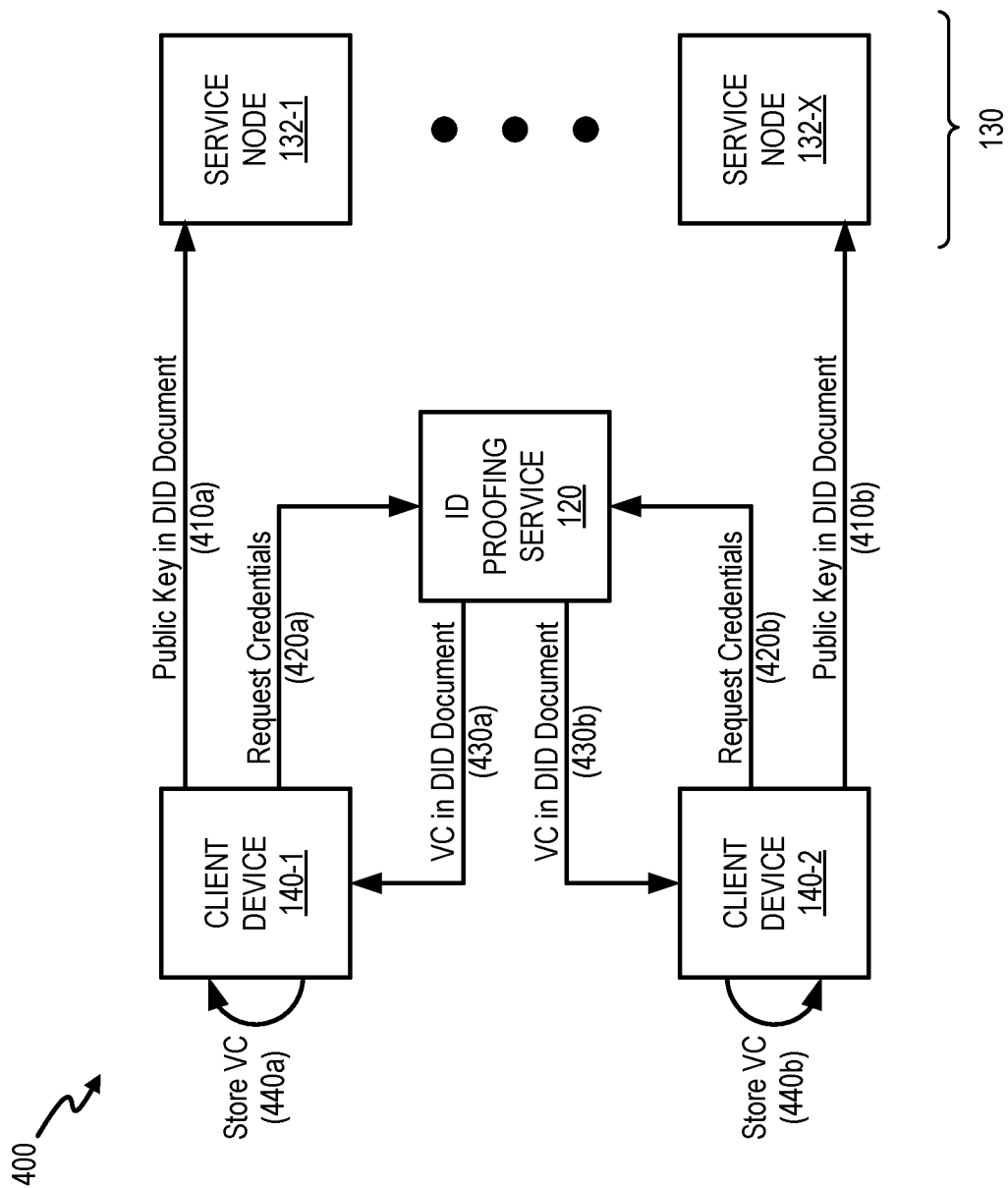
FIG. 4 is a diagram illustrating exemplary communications for establishing a digital identity in a portion of the network environment of FIG. 1.

FIG. 4 is a diagram illustrating communications to establish a digital identity in a portion 400 of network environment 100. As shown in FIG. 4, network portion 400 may include ID proofing service platform 120, service nodes 132-1 and 132-2 within distributed consensus network 130, and client devices 140-1 and 140-2.

Client device 140-1 (e.g., using SSI App 214-1) may generate a shell identity based on a public/private key pair. For example, client device 140-1 may generate a public/private key pair and submit the public key on a blockchain using a decentralized identifier (DID) document with a revoke uniform resource locator (URL). As indicated at reference 410*a*, client device 140-1 may submit the public key to service node 132-1 in distributed consensus network 130. According to an implementation, the DID document may also include an identity-verification-endpoint URL that corresponds to, for example, device cloud agent 220.

In some implementations, a client device 140 (e.g., client device 140-1) may generate one or more derivative identities from the original shell identity. Derivative identities provide additional privacy by preventing the use of the same shell identity with multiple service providers. According to an implementation, each derivative identity may have its own derivative public/private key pair.

Once entered in the blockchain, the public key becomes an immutable, searchable record associated with the user. Only the owner of an identity (holder of a private key) can revoke an identity. To revoke an identity, the owner can add a new block to the ledger (e.g., in distributed consensus network 130) that invalidates the first one. The revoking block will supersede, but not override, the original block since ledger blocks cannot be changed due to the immutability property of the blockchain.

As shown at reference 420*a*, using client device 140-1, an account holder may request credentials from ID proofing service platform 120. For example, client device 140-1 may submit a request to add attributes as verifiable credentials (VCs) to the user's shell identity. Attributes that may become VCs include, for example, a name, date of birth, a social security number, an account number, a location associated with the user, a device identifier, etc. According to an implementation herein, a user may select the particular attributes they choose to make available as verifiable credentials. Each attribute may be incorporated as a separate VC for a user.

ID proofing service platform 120 may generate the verifiable credentials (e.g., as requested by the user) using a DID document. According to an implementation a separate VC may be generated for each attribute requested by a user of client device 140-1. As shown at reference 430*a*, ID proofing service platform 120 may issue the VCs in a DID document to the requesting client device 140-1.

An Identity Proofing service that issued a Verifiable Credential that designates a known identity (e.g., 'Is Known to Us' attribute) may be able to publish a special DID that announces the invalidity of the previously issued VC. This is not considered a revocation of the identity, but rather a way for the Issuer to revoke the trust in an entity. An entity whose 'Is Known to Us' VC has been revoked may still be able to work with another Identity Proofing service to validate itself and acquire a new 'Is Known to Us' VC. The Verifier may decide if the Verifier can trust the VCs from a specific Issuer.

In another implementation, an Issuer can issue the 'Is Known to Us' flag as an Identity Assurance Level (IAL) flag as per the standardized identity guidelines based on the process and data presented for identity proofing. The IAL VC can assume a value of 1, 2 or 3, for example. Value 1 attributes, if any, are self-asserted or should be treated as self-asserted. Value 2 attributes may require remote or in-person identity proofing. Value 3 attributes may require in-person identity proofing. An Issuer can downgrade the IAL VC for a specific entity by publishing new DID referencing the VC along with the Subject Identifier (e.g., the entity that the VC is issued to) and the new IAL value. An IAL value of 0 may be used to designate the loss of trust in a subject.

To reduce the burden on the identity owner to perform identity proofing with ID proofing service platform 120, a client device 140-1 may perform identity proofing by requesting a VC from ID proofing service 120 for its master identity and additional derivative identity in one operation. ID proofing service platform 120 would perform authentication for all derivate identities at the same time and issue one IAL VC per identity (e.g., one IAL VC for the master identity and one IAL VC for each additional derivative identity).

As indicated in above, authentication of each derivate identity may be accomplished individually per derivative identity or in bulk by having ID proofing service platform 120 request (e.g., from client device 140) a signed challenge by all the private keys of all the derivative identities in one operation.

In some implementations, a client device 140 may create a derivative identity when it needs it, at which point the new derivative identity would require an IAL VC and/or additional VCs such as the verified name or address. A client device 140 may submit to an ID proofing service platform 120 an existing identity along with its associated IAL VC, and a proof of ownership of the new derivate identity. ID proofing service platform 120 may associate the new derivative identity with the existing one, and will clone/reissue the IAL VC and/or other requested VCs for each new derivative identity without additional identity proofing.

FIG. 5 provides an example of fields that may be included in a VC 500. A VC 500 may be considered an electronic equivalent of physical credentials, such as physical ID cards, passports, driver licenses, qualifications and awards, etc. VC 500 may be issued and digitally signed by one of various entities (e.g., a telecommunications service provider operating ID proofing service platform 120). According to an implementation, VCs may be provided using Java Script Object Notation (JSON) format.

Generally, VC 500 includes all the elements needed to verify identity without requiring the relying party to go back to the issuer. As shown in FIG. 5, VC 500 may include an attribute linked to the user's public key. VC 500 may include a namespace field 505, a key field 510, a value field 515, a tag field 520, an issuer field 525 and a subject field 530.

Namespace field 505 may include an attribute indication (e.g., "personalinfo.name," etc.). Key field 510 may include the actual attribute name (e.g., "color," "username," etc.). Value field 515 may include a value corresponding to the attribute name (e.g., "pink," "Fred Jones," etc. Tag field 520 may include an alias for the attribute of value field 515. Tag field 520 may accept any unique designation provided by the user for later retrieval. Issuer field 525 may include the identity of a third party that is validating the attribute or "self" if the attribute is self-attested. For example, an address may be validated by an issuer, while a favorite color may be a self-attested attribute. Subject field 530 may include the public key of the entity associated with the attribute (e.g., a user of client device 140, an application instance, etc.).

VC 500 may optionally include an IsArray field 535, a type field 540, a delivery type field 545, a retention policy field 550, a date issued field 555, an expiry field 560, a zero knowledge proof (ZKP) field 565, a date stored field 570, and a classification field 575.

IsArray field 535 may include a binary field (e.g., true/false) indicating whether an array is used. If IsArray field 535 is true, an additional index field allows the implementation of a set of VCs that are related, such as having multiple email addresses or multiple credit cards. The use of the index field along with the tag field 520 provides more information to enable a user to select a specific VC.

Type field 540 may differentiate between different attribute content types, such as text, record (e.g., with multiple fields), image, video, audio, other binary, or consent (e.g., specific authorization). In some implementations, a particular type may include additional format information. For example, a text type may further include a format indication of date, time, number, currency, text, email, IPv4, IPv6, URL, URI, etc. Delivery type field 545 may indicate a delivery format associated with attribute type field 540, such as static or live stream.

Retention policy field 550 may indicate a retention plan for the attribute, such as one-time, persistent (e.g., does not expire until changed), or time-based expiration. If time-based, Retention policy field 550 may include an additional field for the recipient's storage period (e.g., a number of days, weeks, etc.). Date issued field 555 may include the attribute issue date from the issuer (e.g., when issued from ID proofing service platform 120). Expiry field 560 may include an expiration date for the attribute (e.g., a particular date).

Zero knowledge proof (ZKP) field 565 may include an indicator that the attribute provides zero-knowledge proof. In other words, ZKP field 565 may include an indication that the attribute is factually true (e.g., age is over 21 years, lives in a particular state, etc.) without providing personally identifiable information (e.g., a particular birth date, a home address, etc.).

Date stored field 570 may indicate the most recent date an attribute was stored on client device 140, for example. In contrast with an issue date in field 550, date stored field 570 may indicate if an attribute (a VC) was transferred to a different client device 140. Classification field 575 may indicate a data class to suggest a level of privacy. For example, classification field 575 may include options such as personal health information (PHI), personally identifiable information (PII), customer proprietary network information (CPNI), none, etc.

Although FIG. 5 illustrates exemplary fields for VC 500, in other implementations, VC 500 may include fewer, different, or additional field than illustrated in FIG. 5.

Returning to FIG. 4, client device 140-1 may receive the verifiable credentials and, as indicated at reference 440a, client device 140-1 may store the verifiable credentials in a local secure memory of client device 140. The secure local memory may include, for example, iOS Keychain for an APPLE device, Account Manager for an ANDROID device, etc. In one implementation, each verifiable credential 500 may be stored and managed by client device 140 using a digital wallet.

In another implementation, the digital wallet (e.g., a mobile app) may have access to store VC or the private key in secure storage on the device in the Secure Enclave, or on the SIM card in the Secure Element (SE). VCs and other information associated with the identity that is stored outside the Secure Element or Enclave is encrypted with the Private Key to ensure additional security.

As further shown in FIG. 4, other client devices, such as client device 140-2, may perform identical communications with ID proofing service platform 120 and service nodes 132 to establish a digital identity. Similarly, RP platform 150 will generate and register its own SSI identity on the blockchain (e.g., distributed consensus network 130) through a DID document. The identity for RP platform 150 will be the same one presented for all connected users of client devices 140.

Figure 6:
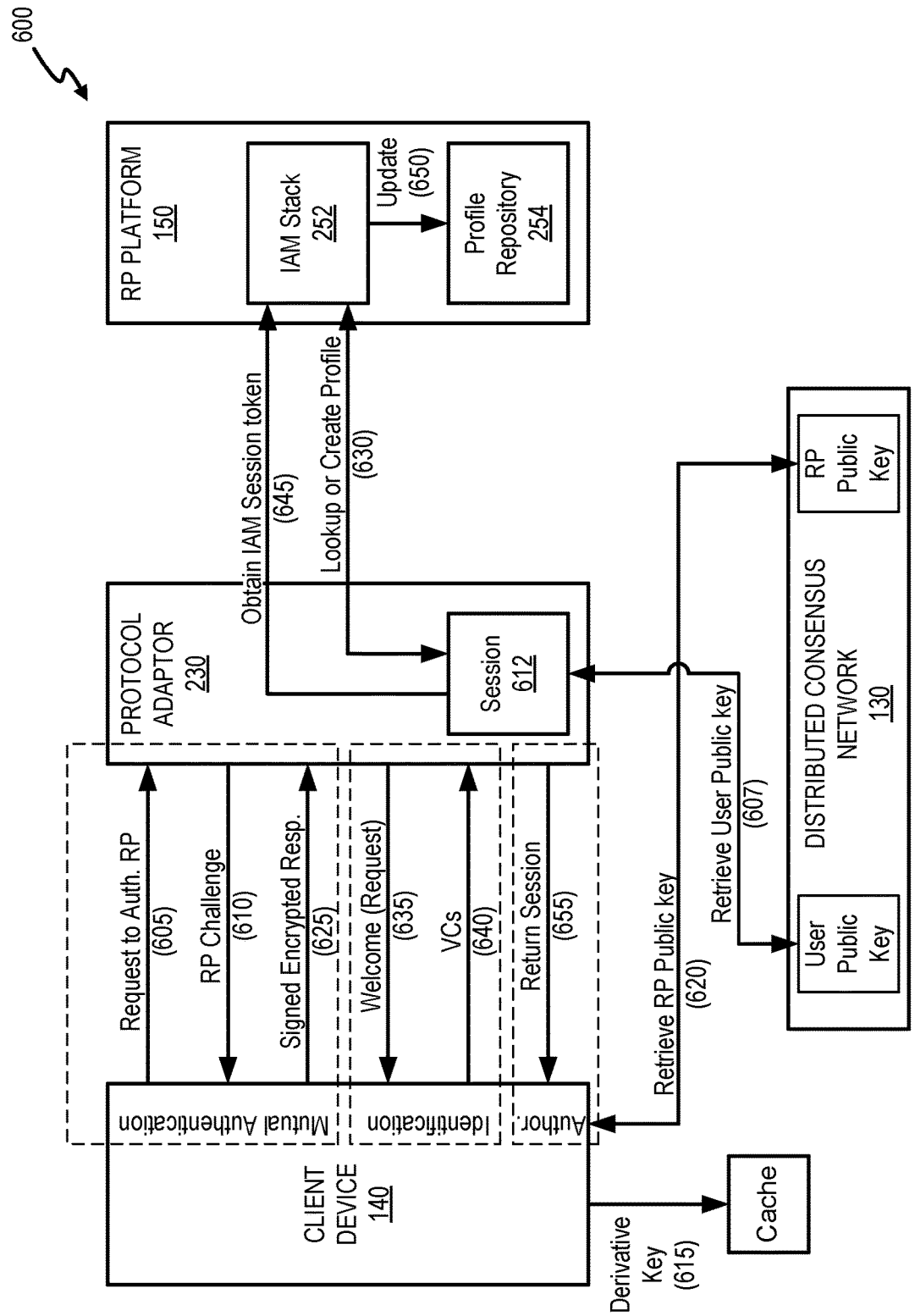
FIG. 6 is a flow diagram illustrating exemplary communications for performing peer-to-peer authentication using an SSI in a portion of the network environment of FIG. 1.

FIG. 6 is a diagram illustrating communications for performing peer-to-peer authentication using a Self-Sovereign Identity (SSI) in a portion 600 of network environment 100. As shown in FIG. 6, network portion 600 may include distributed consensus network 130, client device 140, RP platform 150, and protocol adaptor 230. As indicated in FIG. 6, communications with client device 140 may generally be divided into communications for mutual authentication (references 605-625), identification (references 630-640), and authorization (references 645-655).

Client device 140 may request 605 authorization from a particular relying party, such as RP platform 150. For example, client device 140 may be required to provide authentication/credentials as part of a login process to access services from RP platform 150. The authorization request 605 may request, for example, a session token to use to access RP services 256 (FIG. 2).

Protocol adaptor 230 may conduct a blockchain lookup 607 (in distributed consensus network 130) to confirm the requesting entity and respond to authorization request 605 with a challenge 610. Challenge 610 may include, for example, data requiring encryption by client device 140. Client device 140 may receive challenge 610 and may confirm the identity of RP platform 150 by retrieving the RP public key from distributed consensus network 130, as shown in reference 620.

Client device 140 may generate a response for that particular RP platform 150, by generating a response to the challenge 610 that would include the original challenge and a nonce to prevent replay attacks, and generate a signed response using a client derivative key as referenced in 615. This derivative key will only be used in communication associated with RP platform 150.

As referenced in 625, the signed response is sent from client device 140 to the protocol adaptor 230. Protocol adaptor 230 will validate the signature and ensure it is associated with the previously sent challenge 610 and that completes the authentication process.

When a user attempts to authenticate for the first time with RP platform 150, a profile is created automatically with the DID subject (e.g., public key from an identity shell) as the identifier. A username and password are not required. A database (e.g., profile repository 254) in RP platform 150 is used to record the relationship between the DID subject and the profile ID on the RP platform side. Thus, client device 140 may respond to challenge 610 with a signed encrypted response 625. Upon receiving the signed encrypted response 625, protocol adaptor 230 may confirm, through cryptographic techniques, that the same entity (e.g., client 140) that generated the initial request also generated the signed encrypted response 625. Protocol adaptor 230 may then lookup the profile on RP platform 150 or, if necessary, create a profile and associate the profile to the user's public key, as indicated by reference 630. The profile may be stored in a profile repository 254, which may include a centralized or distributed data structure. In one implementation, profile repository 254 may be implemented as a lightweight directory access protocol (LDAP) database.

Once the profile is created, protocol adaptor 230 may send to client device 140 a request for required and optional VCs which may or may not be sent back client device 140, based on the choice of the user. As shown in FIG. 6, assuming a valid response 625, protocol adaptor 230 may provide a welcome message 635 to client device 140. Welcome message 635 may include a request to consent in sharing of attributes (e.g., particular VCs stored on a secure memory area of client device 140). Based on user input (or previously stored settings), client device 140 may respond, for example, with a consent message 640 providing VCs with the particular attributes. In one implementation, at a minimum, VCs in consent message 640 may include an identity proofer to allow the protocol adaptor 230 to determine if an identity can be trusted. According to an implementation, consent message 640 may also include the requested attributes in a DID document. Client Device 140 and protocol adaptor 230 may each store a copy of the consent for future use and reference.

Protocol adaptor 230 may receive consent message 640 with the requested attributes (e.g., VCs). The VCs may be forwarded to RP platform 150 with a request for a session token, as indicated by reference 645. RP platform 150 may determine if the attributes complete the user profile. Once this authentication is performed using the DID-based protocol, protocol adaptor 230 will communicate with IAM stack 252 and request the access token and, as indicated by reference 655, will return the access token to client device 140 through protocol adaptor 230 to establish a session. Providing the session access token takes places after the exchange of the required attributes, if this is the first time the client is attempting to authenticate to RP platform 150.

As indicated by reference 650, RP platform 150 may update profile repository 254 to record the relationship between the user DID and the profile ID. On subsequent visits of the user of client device 140 to RP platform 150, the DID can be used to lookup the link between the user and the existing profile in profile repository 254.

Figure 7:
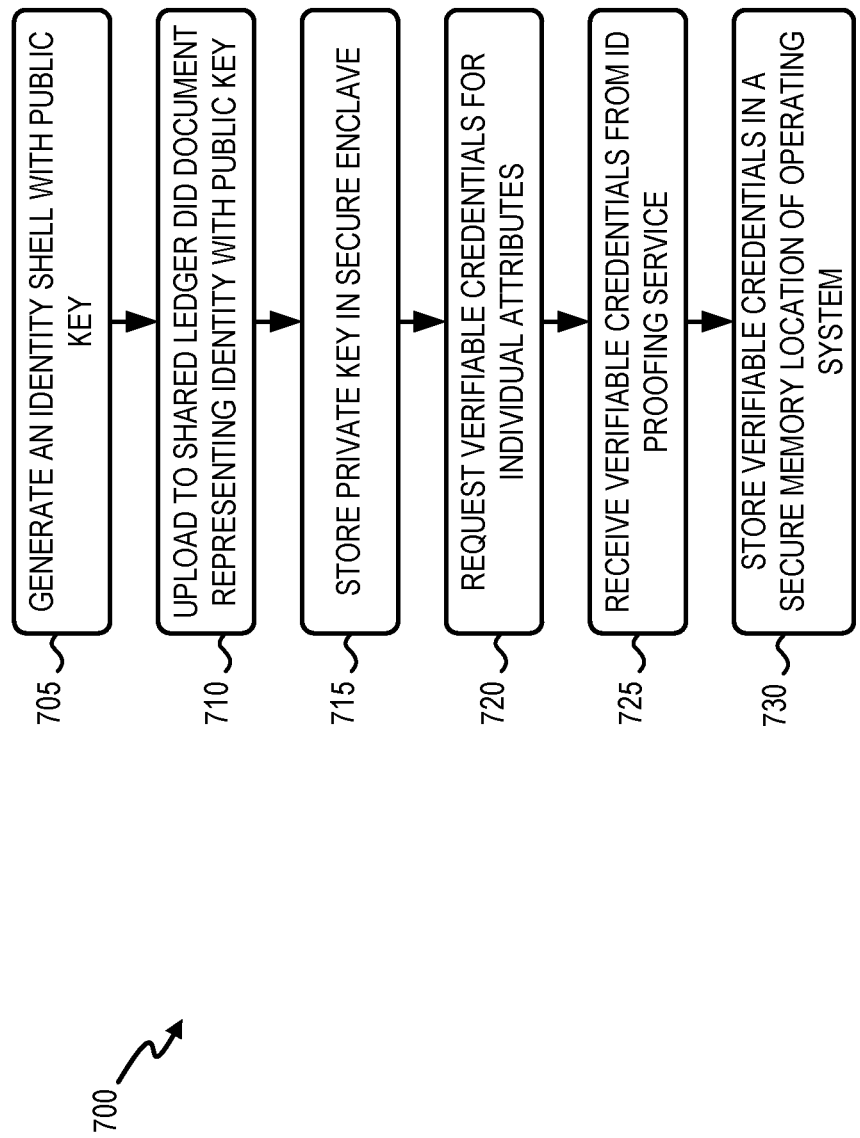
FIG. 7 is a flow diagram illustrating an exemplary process for establishing a digital identity, according to an implementation describe herein.

FIG. 7 is a flow diagram illustrating an exemplary process 700 for establishing a digital identity in a distributed services environment. In one implementation, process 700 may be implemented by a client device 140. In another implementation, process 700 may be implemented by client device 140 in conjunction with ID proofing service platform 120 or another device in network environment 100.

Process 700 may include generating an identity shell with public key (block 705). For example, client device 140 may generate an identity shell for an entity, which may be a user of client device 140, a particular instance of an application residing on client device 140, or a person endorsed by the user (e.g., a relative who is a minor). The identity shell may include a public key of a private/public key pair.

Process 700 may further include uploading to the shared ledger a DID document representing the identity with a public key (block 710) and storing the private key in a secure enclave (block 715). For example, client device 140 may upload the identity shell (e.g., the public key) to a shared ledger in a distributed consensus network 130. The private key may remain stored in a secure enclave of client device 140.

Process 700 may further include requesting verifiable credentials for individual attributes (block 720). For example, client device 140, based on instructions from the user, may request ID proofing service platform 120 to provide one or more VCs associated with attributes of the entity.

Process 700 may also include receiving the verifiable credentials with a digital signature of the ID proofing service (block 725) and storing the verifiable credentials in a secure memory location of the operating system (block 730). For example, client device 140 may receive, from ID proofing service platform 120, one or more verifiable credentials linked to a digital signature. Client device 140 may store the one or more verifiable credentials in a secure memory location associated with an operating system of client device 140.

FIGS. 8 and 9A-9D are flow diagrams illustrating an exemplary process 800 for authenticating and authorizing a user using a digital identity in a distributed services environment. Process 800 may correspond to, for example, communications for mutual authentication, identification, and authorization described above in connection with FIG. 6. In one implementation, process 800 may be implemented by a client device 140. In another implementation, process 800 may be implemented by client device 140 in conjunction with RP platform 150, device cloud agent 220, protocol adaptor 230, or another device in network environment 100.

Process 800 may include initiating a session that requires authentication (block 810). For example, RP application 212 may trigger an authentication request or an off-line request may be initiated via SSI registry 260 and/or device cloud agent 220. As described in connection with FIGS. 9A-9D, a session between RP application 212 on client device 140 and RP platform 150 may be initiated under one of several different exemplary scenarios.

Figure 9C:
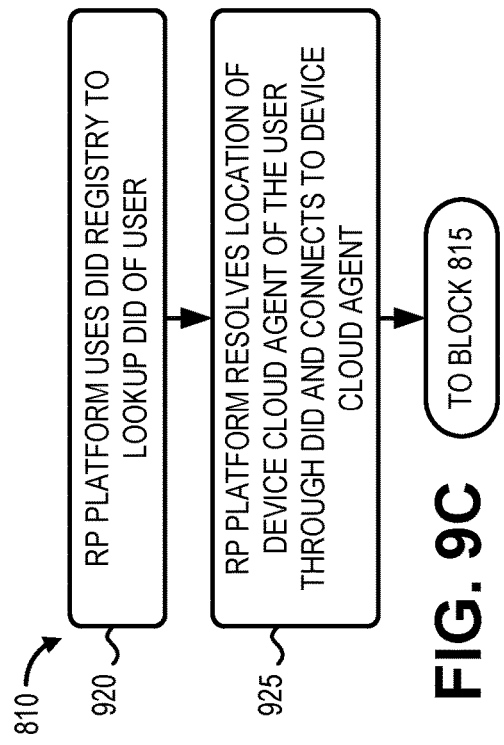
Figure 9D:
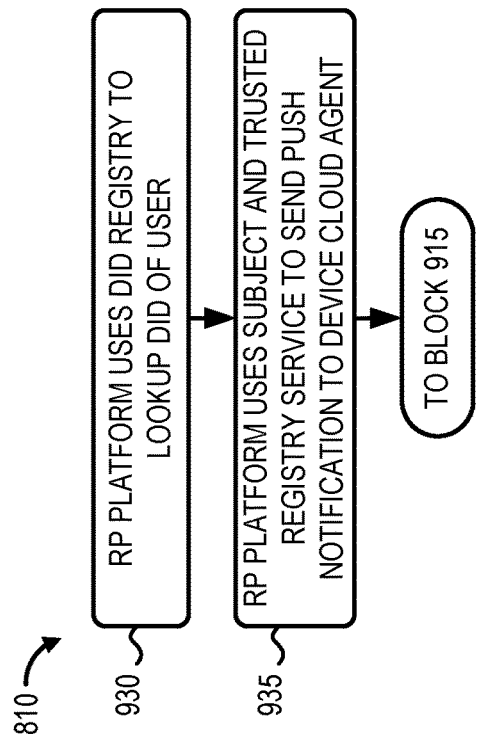
Figure 9A:
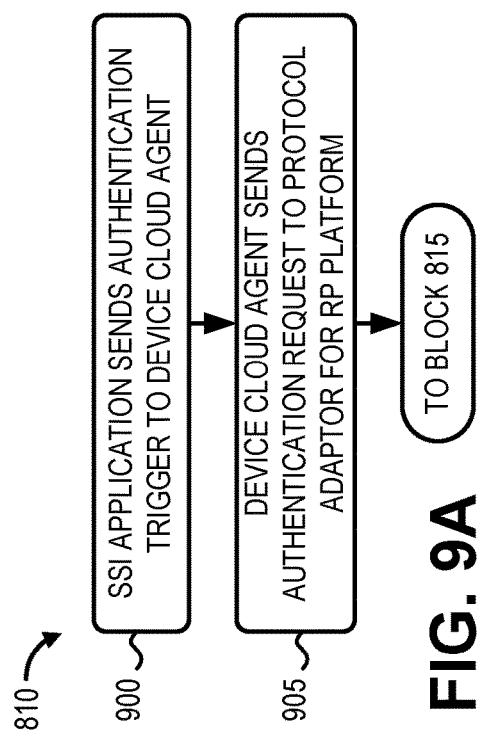

Referring to FIG. 9A, process block 810 may include an SSI application sending an authentication trigger to a device cloud agent (block 900) and the device cloud agent sending an authentication request to a protocol adaptor for an RP platform (block 905). For example, a user of client device 140 may connect to a website or a service by visiting a URL or launching an application an present an identity claim, such as a signed entity. In one implementation, the RP public key is reference to identity. In other implementations, the identity could also be an alias, such as a phone number or an email. In short, the user (e.g., using client device 140) knows the endpoint of RP platform 150 and uses the endpoint to initiate a session via device cloud agent 220 and protocol adaptor 230 (e.g., if an adaptor is used by RP platform 150).

Figure 9B:
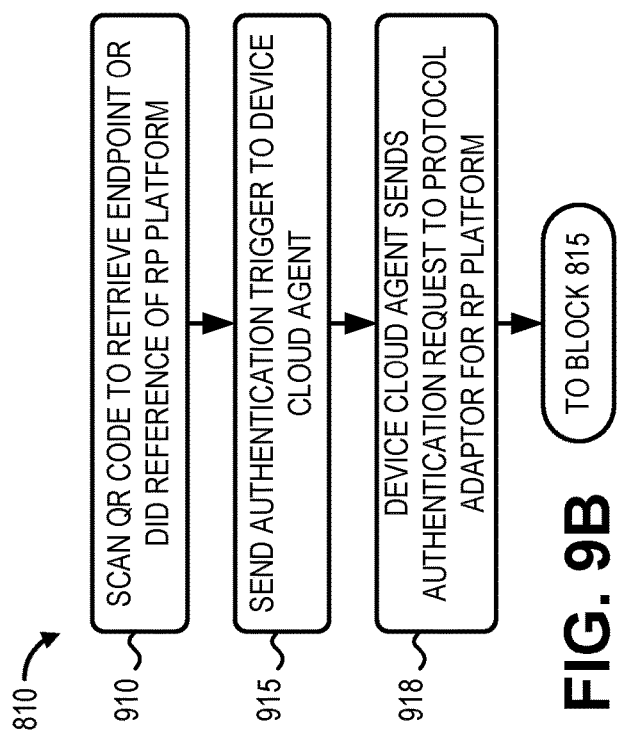

Referring to FIG. 9B, process block 810 may include scanning a QR code to retrieve an endpoint or DID reference of an RP platform (block 910), sending an authentication trigger to a device cloud agent (block 915) and the device cloud agent sending an authentication request to a protocol adaptor for an RP platform (block 918). For example, in the scenario of FIG. 9B, a user may use an app (e.g., RP application 212 on client device 140) to scan a QR code associated with the RP platform 150 (for example, trying to pay at a Point of Sale (POS)). Device 140 may read a QR code (e.g., bar code or another scanned code) to obtain a URL or a DID reference to RP platform 150. Using information from the QR code, RP application 212 may resolve an endpoint for RP platform 150 and, similar to blocks 900 and 905 described above, initiate a session via device cloud agent 220 and/or protocol adaptor 230.

Referring to FIG. 9C, process block 810 may include the RP platform using a DID registry to lookup a DID of a user (block 920) and the RP platform resolving the location of a device cloud agent of the user through the DID and connecting to the device cloud agent (block 925). For example, in this scenario a user may be connecting out-of-band with RP platform 150 (for example, a user may place a telephone call to a calling center). In response to the telephone call, RP platform 150 may initiate the authentication to the caller through the users corresponding device cloud agent. The user (caller) may provide a phone number or account number or any other alias. RP platform 150 (or protocol adaptor 230) may use this alias to look up the user through a DID registry (e.g., SSI registry 260). The DID registry effectively acts like a DNS to resolve the alias to a DID reference in the ledger of distributed consensus network 130. RP platform 150 may retrieve the user DID (e.g., subject and endpoints) and may connect to the user's device cloud agent 220 to initiate the authentication process. In response, device cloud agent 220 may send a wake-up message (e.g., an Extensible Messaging and Presence Protocol (XMPP) message) to client device 140 to confirm that the user intends to participate in an authentication process.

Referring to FIG. 9D, process block 810 may include the RP platform using a DID registry to lookup a DID of a user (block 930), and the RP platform using the subject and a trusted registry service to send a push notification to a device cloud agent (block 935). For example, in this scenario, a user may also be connecting out-of-band with RP platform. RP platform 150 may initiate the authentication to the caller through an app (e.g., RP application 212) on client device 140. The user (caller) may provide a phone number or account number or any other alias. RP platform 150 (or protocol adaptor 230) may use this alias to look up the user through a DID registry (e.g., SSI registry 260). The DID registry is operating a service to which the user has previously subscribed, and which maintains a list of devices (e.g., including client device 140) through a Push Notification (PN) platform. The DID registry may initiate on behalf of RP platform 150 a PN to initiate the authentication process. The PN may be directed to device cloud agent 220 or client device 140. Similar to block 905 described above client device 140 may then initiate a session with RP platform 150 via device cloud agent 220 and/or protocol adaptor 230.

Returning to FIG. 8, process 800 may further include receiving a challenge message (block 815). For example, in response to a trigger from RP application 212 or a wake up message from device cloud agent 220, SSI application 214 on client device 140 may send to RP platform 150 an authentication request that includes the public key for the entity. In response, client device 140 may receive from RP platform 150 (or protocol adaptor 230) a challenge message including data to be encrypted.

Process 800 may also include confirming that relying party is registered in an identity blockchain (block 820), encrypting the data from the challenge message to generate an encrypted response (block 825), and sending the encrypted response to the relying party (block 830). For example, client device 140 may confirm, using an identifier in the challenge message, that RP platform 150 is registered in distributed consensus network 130. Assuming client device 140 confirms RP platform 150, client device 140 may encrypt, using its private key, the data from the challenge message to generate an encrypted response. Client device 140 may send the encrypted response to RP platform 150.

Process 800 may additionally include receiving a welcome message with a request for one or more attributes (block 835), and providing a verified credential to the relying party (block 840), and receive a session token from relying party (block 845). For example, assuming RP platform 150 can cryptographically determine that the encrypted response to the challenge message was generated by the same private key that was used for the entity's identity shell, client device 140 may receive a welcome message from the relying party. The welcome message requests one or more attributes of the entity. In response to the welcome message, and upon approval from the user, client device 140 may provide to RP platform 150 at least one of the requested VCs in response to the welcome message. RP platform 150 may determine that the attributes are valid based on the signature authority of ID proofing service platform 120. RP platform 150 may then send a session token to client device 140, which may be received by client device 140 and used, for example, in a session for RP application 212 to access RP services 256 or other services.

Figure 10:
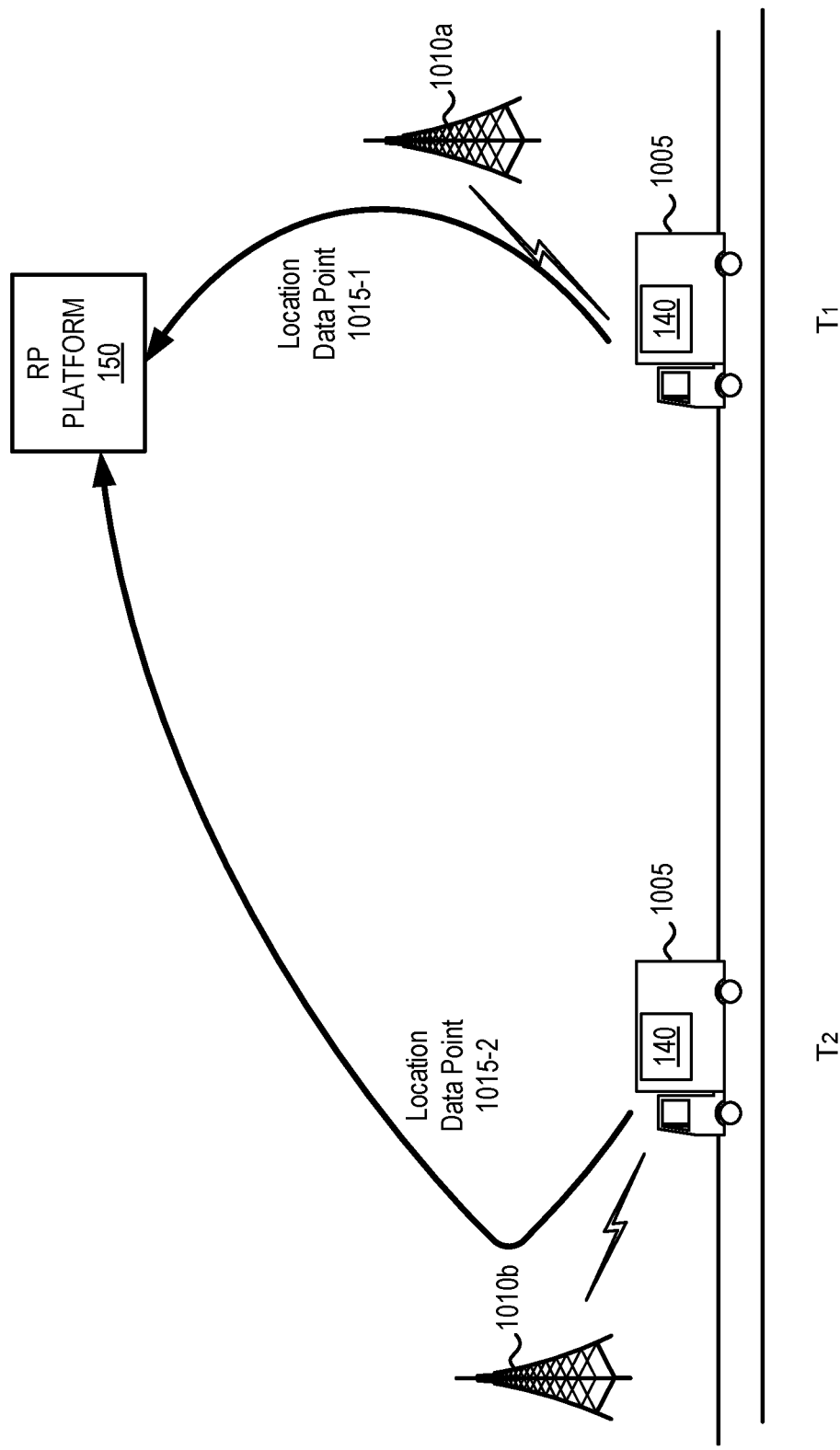
FIG. 10 illustrates an exemplary use case of an SSI, according to an implementation.

FIG. 10 illustrates a use case of SSI implementation consistent with exemplary embodiments. As illustrated in FIG. 10, a vehicle 1005 may be equipped with a client device 140, such as a vehicle telematics unit.

Vehicle 1005 may include, for example, a fleet vehicle (e.g., an armored truck) with a geo-fence to monitor secure deliveries. RP platform 150 may request location tracking information of vehicle 1005. While global positioning system (GPS) systems could be hacked, a position of mobile devices based on connected tower 1010 locations (e.g., triangulation or simply indication of cellular connection) can provide additional or alternate location data. Location reporting may generate a large data volume per vehicle, which may be multiplied across multiple vehicles in a fleet. To verify data integrity, conventional authentication systems would require that each location data point be verified with third-party authentication.

In the example of FIG. 10, RP platform 150 may require client device 140 to provide a VC 500 configured to permit a live data stream (e.g., field 545). Client device 140 may first perform communications with ID proofing service platform 120 for establishing a digital identity (as described in FIG. 4) and then perform communications with RP platform 150 for conducting peer-to-peer authentication using an SSI (as described in FIG. 6). Thus, one or more signed location attributes (e.g., VCs) may be generated by the telecommunications service provider (e.g., that operates ID proofing service platform 120) and provided from client device 140 to RP platform 150.

According to implementations described herein, the signature of ID proofing service platform 120 is provided with each location data point (data point 1015-1 at time T1, 1015-2 at time T2, etc.) from client device 140 and can be validated without a third-party check, which may reduce network traffic, and limit signaling delays for tracking. According to another implementation, location data points 1015 may be implemented as zero-knowledge proof data, with VC 500 configured to provide zero-knowledge proof (e.g., field 565). Thus, location data points 1015 may simply provide confirmation that client device 140 is on an approved route (e.g., within a required geo-fence) without providing specific location data. For example, RP platform 150 may be provided assurance of location compliance by client device 140 without keeping personal information of a user of client device 140. In any event, client device 140 may issue a high volume of traffic for numerous data location points that can be trusted communicating with the data issuer to validate client device 140.

Furthermore, while client device 140 may be used with identification for a particular user. More generally, client device 140 may also support digital identities for other entities, such as application instances on a particular client device, and endorsed identities. For example, instances of a banking application installed on one client device may have a different identity than the same banking application on a different client device 140. Thus, the identity for an application instance may have two components: (a) the identity of the development company, and (b) a unique identifier of the particular application instance. RP platform 150 may, for example, elect to certify a developer, and only allow certified applications from that developer to access RP platform 150.

Similarly, devices (e.g., Internet-of-Things devices, phones, etc.) may use a manufacture and unique application ID. In addition, endorsed identities may be used for spouse/kids/family members of a verified user, where the endorsed parties may not have sufficient attributes to be separately verified. Endorsed identities may have more limited rights than the separately verified endorsing user. According to an implementation, endorsed identities may eventually be upgraded to stand-alone identities while maintaining history from the endorsed period.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of communications and blocks have been described with regard FIGS. 4 and 6-9D, the order of the communications and blocks may be modified according to other embodiments. Further, non-dependent communications or blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 320, etc.), or a combination of hardware and software (e.g., software 335).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 420) of a device. A non-transitory storage medium includes one or more of the storage mediums described in relation to memory 330.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method, comprising:
   generating, by a client device, an identity shell for an entity, the identity shell including a public key of a private/public key pair;
   forwarding, by the client device, the identity shell to a shared ledger in a distributed consensus network;
   storing, by the client device, a private key of the private/public key pair in a first secure memory location of the client device;
   requesting, by the client device and from an identification (ID) proofing service, one or more verifiable credentials for the entity, wherein each of the verifiable credentials includes at least one attribute for the entity;
   receiving, by the client device and from the ID proofing service, the one or more verifiable credentials linked to a digital signature from the ID proofing service;
   storing, by the client device, the one or more verifiable credentials in a second secure memory location of the client device;
   sending, by the client device and to a relying party, an authentication request for the entity, the authentication request including the public key;
   receiving, by the client device and from the relying party, a challenge message including data to be encrypted;
   encrypting, by the client device and using the private key, the data from the challenge message to generate an encrypted response;
   sending, by the client device and to the relying party, the encrypted response;
   providing, by the client device and to the relying party, at least one of the one or more verifiable credentials; and
   receiving, by the client device, a session token from the relying party when the verifiable credentials are accepted.

2. The method of claim 1, wherein the verifiable credentials are configured to be validated by the relying party without communications to the ID proofing service or another party.

3. The method of claim 1, wherein the verifiable credentials include a form of zero-knowledge proof related to an attribute associated with the entity.

4. The method of claim 1, further comprising:
   receiving, by the client device, a welcome message from the relying party when the encryption of the authentication request is confirmed to match the encryption in the encrypted response, wherein the welcome message requests one or more attributes of the entity.

5. The method of claim 1, wherein the entity includes one of an instance of an application, a device, or a user endorsed by the entity.

6. The method of claim 1, wherein, when sending the authentication request, the client device sends the authentication request to a cloud-based agent for the relying party, wherein the cloud-based agent manages validation for the entity.

7. The method of claim 1, wherein the verifiable credentials include a format to accept a live stream of multiple data points.

8. The method of claim 1, wherein the verifiable credentials include an array option to link together multiple verifiable credentials.

9. The method of claim 1, further comprising:
   confirming, by the client device and using an identifier in the challenge message, that the relying party is registered in the distributed consensus network.

10. The method of claim 1, wherein the verifiable credentials include a zero knowledge proof indicator.

11. The method of claim 1, further comprising:
    receiving, from a cloud agent, a wake-up message to initiate an authentication process with the relying party.

12. A client device, comprising:
    one or more memory devices for storing instructions; and
    one or more processors configured to execute the instructions to:
      generate an identity shell for an entity, the identity shell including a public key of a private/public key pair;
      forward the identity shell to a shared ledger in a distributed consensus network;
      store a private key of the private/public key pair in a first secure memory location of the client device;
      request, from an identification (ID) proofing service, one or more verifiable credentials for the entity, wherein each of the verifiable credentials include at least one attribute for the entity;
      receive, from the ID proofing service, the one or more verifiable credentials linked to a digital signature from the ID proofing service;
      store the one or more verifiable credentials in a second secure memory location of the client device;
      send, to a relying party, an authentication request for the entity, the authentication request including the public key;
      receive, from the relying party, a challenge message including data to be encrypted;
      encrypt, using the private key, the data from the challenge message to generate an encrypted response;
      send, to the relying party, the encrypted response;
      provide, to the relying party, at least one of the one or more verifiable credentials; and
      receive a session token from the relying party when the verifiable credentials are accepted.

13. The client device of claim 12, wherein the verifiable credentials are configured to be validated by the relying party without communications to the ID proofing service or another party.

14. The client device of claim 12, wherein the entity includes one of an application, a device, or a user endorsed by the entity.

15. The client device of claim 12, wherein the one or more processors are further configured to execute the instructions to:
generate a derivative identity from the identity shell, wherein the derivative identity uses a different public/private key pair, and wherein the derivative identity is designated for use with a particular relying party.

16. The client device of claim 12, wherein the one or more processors are further configured to execute the instructions to:
request, from the ID proofing service, another verifiable credential for the entity; and
receive, from the ID proofing service, a challenge for the other verifiable credential linked to another digital signature from the ID proofing service.

17. A non-transitory computer-readable medium containing instructions executable by at least one processor of a client device, the computer-readable medium comprising one or more instructions to:
generate an identity shell for an entity, the identity shell including a public key of a private/public key pair;
forward the identity shell to a shared ledger in a distributed consensus network;
store a private key of the private/public key pair in a first secure memory location of the client device;
request, from an ID proofing service, one or more verifiable credentials for the entity, wherein each of the verifiable credentials include at least one attribute for the entity;
receive, from the ID proofing service, the one or more verifiable credentials linked to a digital signature from the ID proofing service;
store the one or more verifiable credentials in a second secure memory location of the client device;
send, to a relying party, an authentication request for the entity, the authentication request including the public key;
receive, from the relying party, a challenge message including data to be encrypted;
encrypt, using the private key, the data from the challenge message to generate an encrypted response;
send, to the relying party, the encrypted response;
provide, to the relying party, at least one of the one or more verifiable credentials; and
receive a session token from the relying party when the verifiable credentials are accepted.

18. The non-transitory computer-readable medium of claim 17, wherein the verifiable credentials are configured to be validated by the relying party without communications to the ID proofing service or another party.

19. The non-transitory computer-readable medium of claim 17, wherein the instructions are further to:
receive, from a cloud agent, a wake-up message to initiate an authentication process with the relying party; or
receive, from an application on the client device, a request to initiate the authentication process with the relying party.

20. The non-transitory computer-readable medium of claim 17, wherein the instructions are further to:
receive a welcome message from the relying party when the encryption of the authentication request is confirmed to match the encryption in the encrypted response, wherein the welcome message requests one or more attributes of the entity.

* * * * *